(12) United States Patent
Letovsky

(10) Patent No.: US 7,361,091 B2
(45) Date of Patent: Apr. 22, 2008

(54) PLAYER SKILL EQUALIZER FOR VIDEO GAMES

(76) Inventor: Howard Letovsky, P.O. Box 1925, Willits, CA (US) 95490

( * ) Notice: Subject to any disclaimer, the term of this patent is extended or adjusted under 35 U.S.C. 154(b) by 355 days.

(21) Appl. No.: 11/246,339

(22) Filed: Oct. 7, 2005

(65) Prior Publication Data

US 2007/0082729 A1  Apr. 12, 2007

(51) Int. Cl.
A63F 9/24 (2006.01)
A63F 13/00 (2006.01)
G06F 17/00 (2006.01)
G06F 19/00 (2006.01)

(52) U.S. Cl. .................................................. 463/23
(58) Field of Classification Search ................. 463/23
See application file for complete search history.

(56) References Cited

U.S. PATENT DOCUMENTS

| | | | |
|---|---|---|---|
| 2,826,828 A * | 3/1958 | Hamilton | 434/342 |
| 4,593,904 A | 6/1986 | Graves | |
| 4,695,053 A | 9/1987 | Vasquez, Jr. et al. | |
| 5,342,049 A | 8/1994 | Wichinske et al. | |
| 6,343,989 B1 * | 2/2002 | Wood et al. | 463/23 |
| 6,638,160 B2 * | 10/2003 | Yoshitomi | 463/7 |
| 6,811,482 B2 | 11/2004 | Letovsky | |
| 6,884,168 B2 * | 4/2005 | Wood et al. | 463/23 |
| 6,913,536 B2 * | 7/2005 | Tomizawa et al. | 463/43 |
| 6,964,610 B2 * | 11/2005 | Yamauchi et al. | 463/23 |

OTHER PUBLICATIONS

Red Storm, Tom Clancy's Rainbow Six: Raven Shield, Mar. 2003.*
Atari, Ikaruga game manual, 2001.*

* cited by examiner

Primary Examiner—George Nguyen
Assistant Examiner—Thomas H Henry

(57) ABSTRACT

The present invention senses a player's coordination and reaction time levels while operating a video game, or a video game of chance, and automatically adjusts various parameters affecting the game play, to minimize or eliminate the effect that said player's skill has on a game outcome. In certain circumstances, the present invention may actually provide an element of control over the game outcome, but the intent of the invention is to bridge the entertainment gap that currently exists between skill based video game entertainment and the traditional formats of video games of chance—resulting in a much broader demographic appeal for video games of chance.

7 Claims, 2 Drawing Sheets

PLAYER SKILL EQUALIZER FOR VIDEO GAMES

BACKGROUND

1. Field of Invention

This invention relates generally to video games and video games of chance. More specifically, the present invention relates to video gaming devices that provide a player with a sense of control over the outcome of a video game or video game of chance, even though said games may actually be configured to have a randomized win or loss result.

2. Description of Prior Art

Video games and video games of chance are widely known in prior art. Typically, the winning conditions for video games are skill based, and the winning conditions for video games of chance—such as video slot machines—are determined by a randomizing computer program. There is a new direction in video slot machines, as disclosed in my issued U.S. Pat. No. 6,811,482, incorporated herein by reference, which is oriented to blending the player interactivity offered by video games with the universal appeal of cash payouts offered by video games of chance.

Video game systems—as opposed to video gaming (games of chance) systems—typically provide skill-based entertainment, wherein a player is rewarded with points or credits following successful interaction with the game elements.

As disclosed in the following patents, herein incorporated by reference in their entirety, the basic premises of chance games, combined chance and skill, and multiple player chance games are disclosed. In U.S. Pat. No. 6,811,482 issued to this inventor, I disclosed a "Video Game of Chance Apparatus that provides a "video game style" virtual 3D world with 3D images within it that creates a feeling of game interaction and control for a player in a game of chance. In U.S. Pat. No. 4,695,053, as issued to Vazquez, Jr., et al, a combination skill and chance based gaming device is disclosed that provides certain machine predetermined winning combinations of symbols in combination with others that are player selectable. In U.S. Pat. No. 5,342,049, as issued to Wichinsky, et al., A gaming machine is disclosed that combines a random selection feature with a skill feature to allow the player to utilize his ability to manipulate the skill feature to improve his chances of winning on the gaming machine. In U.S. Pat. No. 4,593,904, as issued to Graves, a multiple player interactive gaming system is disclosed that allows players at remote gaming terminals to interact with an identical series of choices.

Since it is a requirement in most regulatory jurisdictions that games of chance not incorporate skill as a factor in determining the win or lose outcome of a game of chance, the present invention provides a unique and novel means to sense a player's reaction times and hand-eye coordination levels, and instantly adjust the game event parameters in a video game—or a video game of chance—to allow players of all skill levels to experience said games in similar ways so that the win or lose outcome of said games is not necessarily affected by said player skill levels.

OBJECTIVES AND SUMMARY OF THE PRESENT INVENTION

The objective of the present invention is to provide a to provide an automatic skill level sensing and equalizing gaming apparatus that incorporates the feeling of control that a player experiences when playing a skill based video game, yet have the capability to maintain the random outcome requirements of standard video games of chance. In certain circumstances, the present invention may actually provide an element of control over the outcome, but it is the feeling of control—not necessarily actual control—that provides the unique entertainment value. The intent of the invention is to bridge the entertainment gap that currently exists between skill based video game entertainment and the traditional formats of video games of chance—resulting in a much broader demographic appeal for video games of chance.

The present invention as further described herein, senses a player's hand-eye coordination level and reaction times, and adjusts various parameters affecting game play to minimize or eliminate the effect that said player's skill and coordination level has on a game outcome.

At the start of each game, an array of randomly or fixedly spaced images may be created which could appear to the player as either fixed or moving "targets" that can be selected with a targeting control input device such as a touch screen, trackball, joystick, or other human interface device. When the player aims at a target with said human interface device, and presses a button, or touches the screen to confirm said locked-on condition, a virtual projectile, or other virtual collision element, may be activated. Further, if the player does not react to the targets in a predetermined time frame, the game software may automatically complete the game.

Another objective of the present invention is to provide an automatic skill level sensing and equalizing, two-way video gaming apparatus, for accommodating a plurality of players. Said gaming apparatus may include a central data processing station and a plurality of remote display gaming units. A two-way data link may be provided for connecting the central data processing station to the remote display gaming units. Each of the remote display gaming units may be capable of receiving image generation and position data from the data link and displaying a plurality of images in response to said data. A control means may be provided on each remote display gaming unit to allow a player to interact with the displayed images, and the results of said interactions may then be transmitted through the data link to the central data processing station. All these interactions may then be compared and a winner, or set of winners, may be selected based on the interactions and an established algorithm for winner selection. For example, the player who successfully fires virtual projectiles at the highest number of targets associated with his remote display unit in a game of chance may win the jackpot.

The above described objectives and many other features of the present invention will become better understood by reference to the following detailed description when taken in conjunction with the drawings.

DETAILED DESCRIPTION OF THE PREFERRED EMBODIMENT

Figure 1:
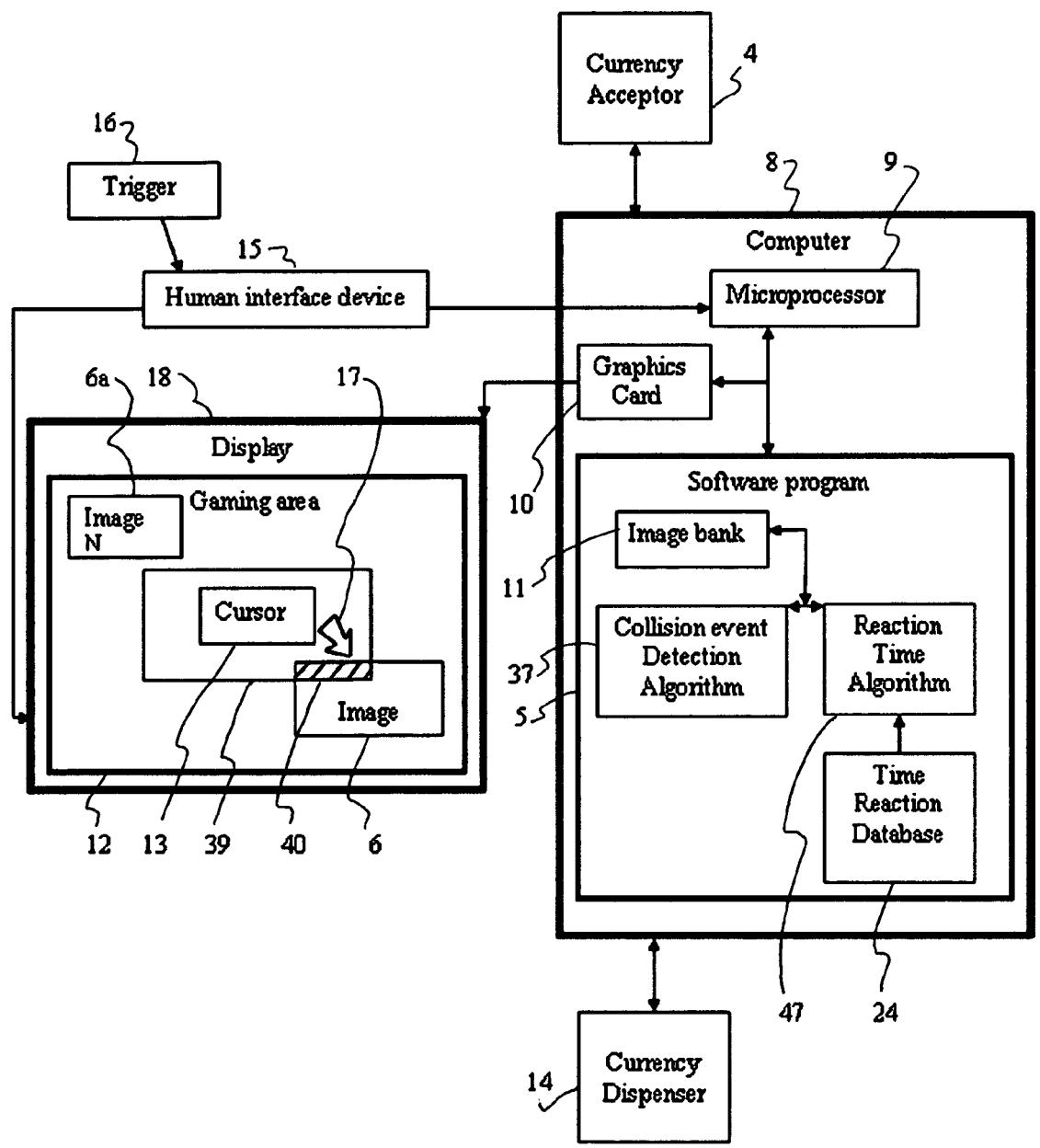
FIG. 1 is a logical block diagram of the hardware elements and software functions of the skill equalizer according to the invention.

The preferred embodiment of the present invention, as presented in the software logic and hardware component flow chart in FIG. 1, is an automatic skill level equalizing gaming apparatus that senses a player's hand-eye coordination level and reaction times, and adjusts certain parameters affecting game play to minimize or eliminate the effect that said player's hand-eye coordination level and reaction times have on a game outcome. The invention utilizes a software program 5, configured to operate on a standard microprocessor based computer 8, well known in prior art, to generate an image 6 within a gaming area 12, as well as render gaming area 12. A currency acceptor 4 may be electrically coupled to computer 8 to allow games to played for money.

The most successful video game genres include first person shooters, flying, driving, and fighting games. The present invention as disclosed is equally effective in all of these genres in equalizing game play for players of all skill levels. I have chosen a shooting style of game play to illustrate the novel and unique elements of the invention, however, the technology will remain essentially the same for all video game genres.

In the present invention, a "3D" graphics card 10 may be utilized as an integral part of computer 8, and software program 5, to generate a three dimensional virtual world referred to herein as gaming area 12. Graphics card 10 is well known in prior art, so there is no need to go into great detail herein. Software program 5 runs on microprocessor 9 within computer 8. Said software program 5 is configured to create a computer generated, virtual world, gaming area 12. Computer 8 may also generate and display variable sized virtual worlds as said gaming area 12. Gaming area 12 is presented to a player on display means 18. Display means 18 may be a video monitor, a television, or any other electronic or mechanical means capable of displaying computer generated graphic images.

Referring now to FIG. 1, an image bank 11 is provided within said software program 5 that acts as a library from which software program 5 generates any image 6 to present within gaming area 12 on display means 18. Image 6 can be a graphical representation of anything at all. The trajectory initiation, direction, and termination functions of any image 6 are software configurable as any moving or stationary position within and throughout gaming area 12.

The player may then use a human interface device 15 to aim a position indicator such as a virtual cursor 13, generated by game software 5, toward an image 6, and input a collision event command signal using a trigger 16 incorporated into human interface device 15, to launch a virtual projectile 17 toward any image 6. Human interface device 15 may be a joystick, trackball, touch screen, button, or other human interface means as the player control means integrated within any video game device well known in prior art. Said cursor 13 may also be represented graphically as a weapon, a car, a plane, a character, or anything else. Said virtual projectile 17 may also be represented graphically as a weapon, a car, a plane, a character, or anything else.

When a player interacts with an image 6 by aiming cursor 13 toward said image 6, and pressing trigger 16, collision proximity detection algorithm 37 integrated into software program 5, may then be configured to determine the "relative proximity" of said cursor 13 to said image 6, and then also compare the relative proximity of cursor 13 to any other "image N" 6a, and then adjust the effective size of any virtual projectile 17, or the effective size of cursor 13, so that a collision event 40, defined by software program 5, is completed between image 6 and virtual projectile 17, or cursor 13.

The basic mathematical structure of the collision proximity detection algorithm 37 works equally well for both two dimensional and three dimensional video games. Said collision proximity detection algorithm 37 establishes all XY or XYZ position points from the center of a virtual projectile 17, or the center of a cursor 13, or the center of an image 6, or the center of an "image N" 6a, and is structured logically as follows:

| | | |
|---|---|---|
| IF | Cursor 13 is located at: | XY position D |
| AND | Image 6 is located at: | XY position E |
| AND | Image "N" 6a is located at: | XY position F |
| AND | Virtual Projectile 17 launches from: | XY position G (or D) |
| AND | The distance from D to E is less than the distance from D to F | |
| THEN | Virtual Projectile 17 will travel from: | G to E position to result in a Collision Event 40 |
| OR | Cursor 13 will effectively expand to contact position E. | |

The effective cursor size bounding box 39 indicates this effective enlargement of a cursor 13 within gaming area 12. Further, the trajectory initiation, direction, and termination functions of any virtual projectile 17 are software configurable within the invention software program 5 as either fixed or random positions within and throughout gaming area 12. Software program 5 may also be configured such that if a player does not react to an image 6 within a predetermined time frame of generation of said image 6 by software program 5, the software program 5 may be configured with algorithms to automatically complete the game for the player.

The invention may also be used to adjust the game play to minimize or eliminate the effect that a player's reaction time has on a game outcome, utilizing the software logic and hardware component flow chart as shown in FIG. 1. Specifically, when a player interacts with an image 6 by aiming cursor 13 toward said first image 6, and pressing trigger 16, "reaction time detection 47" algorithm integrated into software program 5, may then be configured to determine the "time of initial movement" of said cursor 13 toward said image 6 by a player, and then compare that time to a "preset minimum or maximum time of initial movement 24" database—and then adjust the rate of movement of any image 6, so that when said projectile 17 is launched by a player by activating trigger 16, a collision event 40, detectable by software program 5, is completed between image 6 and virtual projectile 17 or cursor 13. Software program 5 may also be configured such that if a player does not react to an image 6 within a predetermined time frame, the software program 5 may be configured to automatically complete a game for the player.

A payout chute 14 may be electrically coupled to computer 8 to dispense currency to a player.

Figure 2:
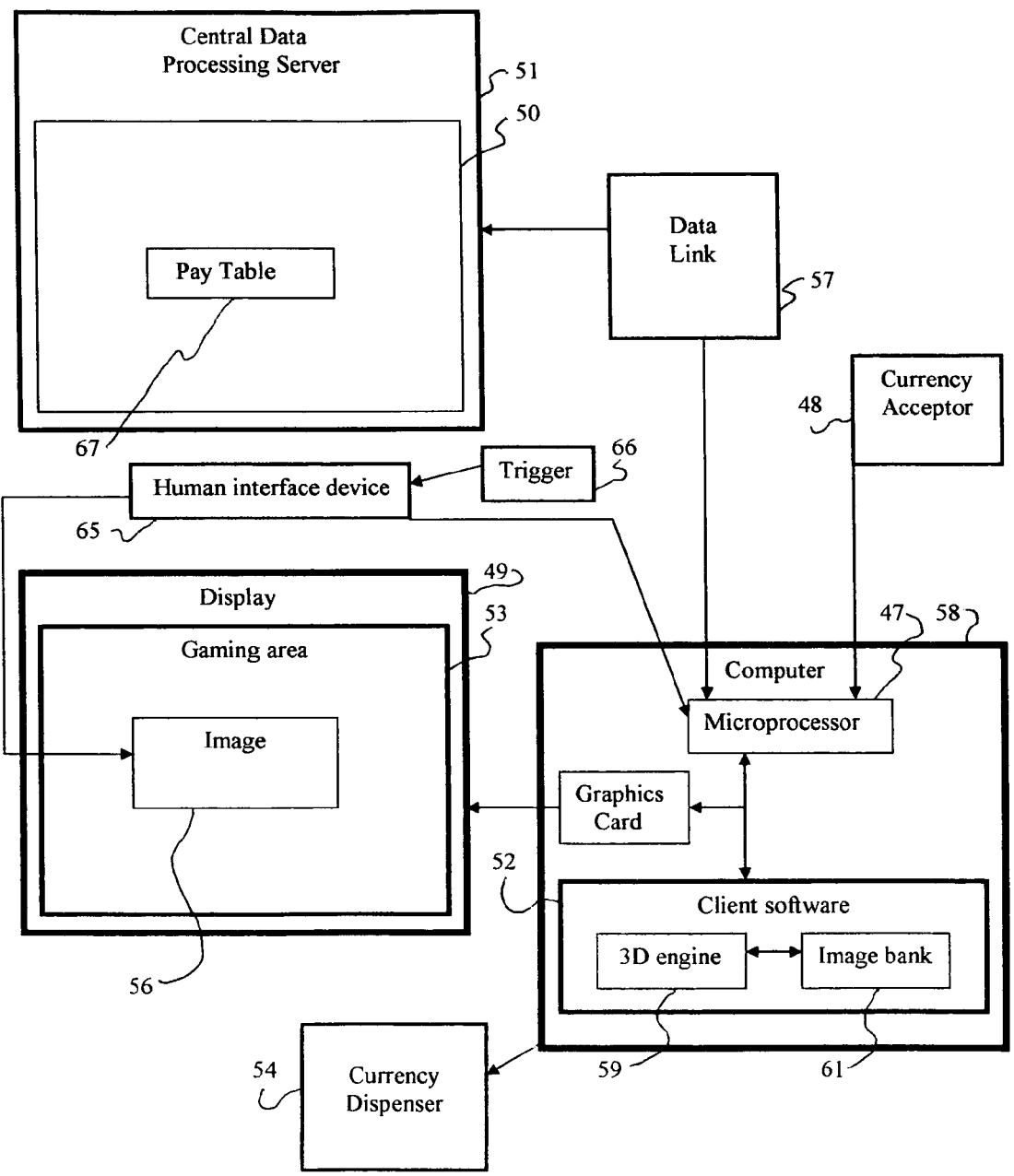
FIG. 2 is a logical block diagram of a gaming apparatus according to the invention providing multiple player capability.

In a multiple player environment as disclosed in FIG. 2, a client/server computer network, well known in prior art, is configured such that more than one player may individually interact with any image 56 through any human interface means 65 coupled to any remote gaming computer 58, fitted with a microprocessor 47. A currency acceptor 48 is electrically coupled to gaming computer 58 to allow players to play games for money. The timing of each player's interaction with, as well as the position of image 56 at said time of interaction, may then be transmitted to the central data processing server 51 by client software program 52 on remote gaming computer(s) 58. These interactions may then be analyzed by server software 50 on central data processing server 51, and the proper winning interaction or interactions determined by an algorithm that compares all said player interactions, or set of interactions. All of the remote gaming computer(s) 58 may then be provided with win or loss information with respect to each set of interactions from the central data processing station 51 through data link 57. Each individual remote gaming computer(s) 58 may then respond to said win/loss information and provide the player a gain or reduction in credits or currency.

All of the image generation capabilities and game characteristics embodied within software program 52 are actually incorporated within server software 50 on central data processing station 51 and the client software program 52 on remote gaming computer(s) 58—but said image generation capabilities and game characteristics are divided between the two systems. In a multi-player environment, certain tasks that are normally handled by one software program are necessarily split up between several software programs, and several pieces of hardware. For example, in a multi-player configuration, server software 50 may transmit image generation data over data link 57 to client software program 52. Client software program 52 would then use 3D engine 59 to render an image 56 from image bank 61 on remote gaming computer 58 to video display 49, in a computer generated gaming area 53. Human interface device 65 and trigger 66 in the multi-player configuration described in FIG. 2, would be used in the same way as the embodiment of the invention as described in the specification for FIG. 1, but would be coupled to remote gaming computer 58, and through client software program 52, would provide target image 56 interaction data to central data processing server 51 over data link 57. A pay table 67, incorporated into server software 50, may activate payout functions on client software program 52 to enable a currency dispenser 58 to dispense currency to a player.

Having thus described exemplary embodiments of the present invention, it should be noted by those skilled in the art that the within disclosures are exemplary only and that various other alternatives, adaptations, and modifications may be made within the scope of the present invention. Although the present invention has been described in connection with details of the preferred embodiment, many alterations and modifications may be made without departing from the invention. Accordingly, it is intended that all such alterations and modifications may be considered as within the spirit and scope of the invention as defined in the appended claims.

I claim:

1. A Video Game Player Skill Equalizer comprising, in combination:

a computer means;

a computer program product;

said computer program residing on a computer readable medium on said computer means, and configured to generate a virtual world drawn from a first library of visual elements contained within said first computer program, and to present said virtual world to a player on a visual display means;

said computer program further configured to generate at least two images drawn from a second library of visual elements contained within said computer program, and present said at least two images to said player within said virtual world;

at least one player control signal input means interfaced to said computer means, and Configured to register an x, y, or x, y, z axis coordinate within said computer program, in response to a player initiated control signal input;

said computer program being further configured to complete a collision event between the x, y, or x, y, z axis coordinate defined by said player initiated control signal input and the nearest x, y, or x, y, z axis coordinate of at least one image of said at least two images, and said collision event being completed by said computer program without any additional control signal input initiated by said player;

wherein, if the player does not react to at least one image of said at least two images in a predetermined time frame, said computer program may automatically complete a collision event with said at least one image.

2. A Video Game Player Skill Equalizer in accordance with claim 1 that provides at least one joystick, trackball, touch screen, button, or other human interface means as the player control means for allowing player interaction with said at least one image said virtual three-dimensional world.

3. A Video Game Player Skill Equalizer in accordance with claim 1 that provides at least one means to allow more than one player to simultaneously participate in a video game of chance.

4. A Video Game Player Skill Equalizer in accordance with claim 1 which provides apparatus for accommodating at least one player at a remote location, said apparatus comprising: a central data processing server;

at least one remote gaming computer;

a two-way data link connecting said central data processing server to said remote gaming computer; said remote gaming computer having:

means for receiving image generation and position data from said central data processing station;

means for displaying images generated from said image generation and position data; means for inputting a response from a player to the image generation and position data; means for transmitting said response to said image generation and position data to said central data processing server over said data link, and said central data processing server having:

means for receiving said responses to said image generation and position data over said data link from said remote gaming computer;

means for comparing said responses from more than one remote gaming computer to determine the win or loss condition of said remote gaming computers; and means for transmitting a win or loss condition signal to said remote gaming computers.

5. A Video Game Player Skill Equalizer in accordance with claim 1 that incorporates at least one means to accept currency or a currency equivalent from a player.

6. A Video Game Player Skill Equalizer in accordance with claim 1 that incorporates at least one means to return said currency or a currency equivalent payout to a player.

7. A Video Game Player Skill Equalizer in accordance with claim 1 that incorporates at least one collision event completion algorithm that establishes all XY or XYZ position coordinates of the center of a virtual projectile, or the center of a cursor, or the center of a first image, or the center of a secondary image, all within said virtual world, and is structured logically as follows:

| IF | a Cursor is located at: | XY position D |
|---|---|---|
| AND | a first Image is located at: | XY position E |
| AND | a secondary Image is located at: | XY position F |
| AND | a Virtual Projectile launches from: | XY position G (or D) |
| AND | the distance from said position D to position E is less than the distance from position D to position F | |
| THEN | said Virtual Projectile will travel from position G to position E to result in a collision event | |
| AND/ OR | said Cursor will effectively expand in size to result in a collision event with any said image located on E. | |

* * * * *